United States Patent
Fischer et al.

(10) Patent No.: US 9,569,175 B2
(45) Date of Patent: Feb. 14, 2017

(54) FMA UNIT, IN PARTICULAR FOR UTILIZATION IN A MODEL COMPUTATION UNIT FOR PURELY HARDWARE-BASED COMPUTING OF FUNCTION MODELS

(71) Applicant: Robert Bosch GmbH, Stuttgart (DE)

(72) Inventors: Wolfgang Fischer, Gerlingen (DE); Andre Guntoro, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 14/283,528

(22) Filed: May 21, 2014

(65) Prior Publication Data
US 2014/0351309 A1    Nov. 27, 2014

(30) Foreign Application Priority Data
May 24, 2013  (DE) .......................... 10 2013 209 657

(51) Int. Cl.
  *G06F 7/544*   (2006.01)
  *G06F 7/483*   (2006.01)

(52) U.S. Cl.
  CPC ............ *G06F 7/483* (2013.01); *G06F 7/5443* (2013.01)

(58) Field of Classification Search
  CPC ................................ G06F 7/5443; G06F 7/57
  USPC .................................................. 708/501, 523
  See application file for complete search history.

(56) References Cited

U.S. PATENT DOCUMENTS

| 7,080,111 | B2 | 7/2006 | Pangal et al. |
| 7,346,642 | B1 | 3/2008 | Briggs et al. |
| 2006/0136540 | A1* | 6/2006 | Tang ..................... G06F 7/5443 708/495 |
| 2013/0110749 | A1* | 5/2013 | Streichert ........... F02D 41/1401 706/12 |
| 2014/0089371 | A1* | 3/2014 | Dupont De Dinechin et al. ........................ G06F 7/483 708/503 |
| 2014/0310325 | A1* | 10/2014 | Lang ........................ G06F 1/02 708/270 |
| 2015/0012574 | A1* | 1/2015 | Fischer ................... H03M 7/02 708/105 |

FOREIGN PATENT DOCUMENTS

| DE | 10 2010 028 266 | | 10/2011 | |
| DE | 102010028266 | A1 * | 10/2011 | ......... F02D 41/1401 |

OTHER PUBLICATIONS

N. Brunie, F. de Dinechin and B. de Dinechin, "A mixed-precision fused multiply and add," 2011 Conference Record of the Forty Fifth Asilomar Conference on Signals, Systems and Computers (ASILOMAR), 2011.*
C. E. Rasmussen et al., "Gaussian Processes for Machine Learning," MIT Press 2006.

* cited by examiner

*Primary Examiner* — Matthew Sandifer
(74) *Attorney, Agent, or Firm* — Norton Rose Fulbright US LLP

(57) ABSTRACT

An FMA unit, for carrying out an arithmetic operation in a model computation unit of a control unit, is configured to process input of two factors and one summand in the form of floating point values, and provide a computation result of such processing as an output variable in the form of a floating point value. The FMA unit is designed to carry out a multiplication and a subsequent addition, the bit resolutions of the inputs for the factors being lower than the bit resolution of the input for the summand and the bit resolution of the output variable.

13 Claims, 2 Drawing Sheets

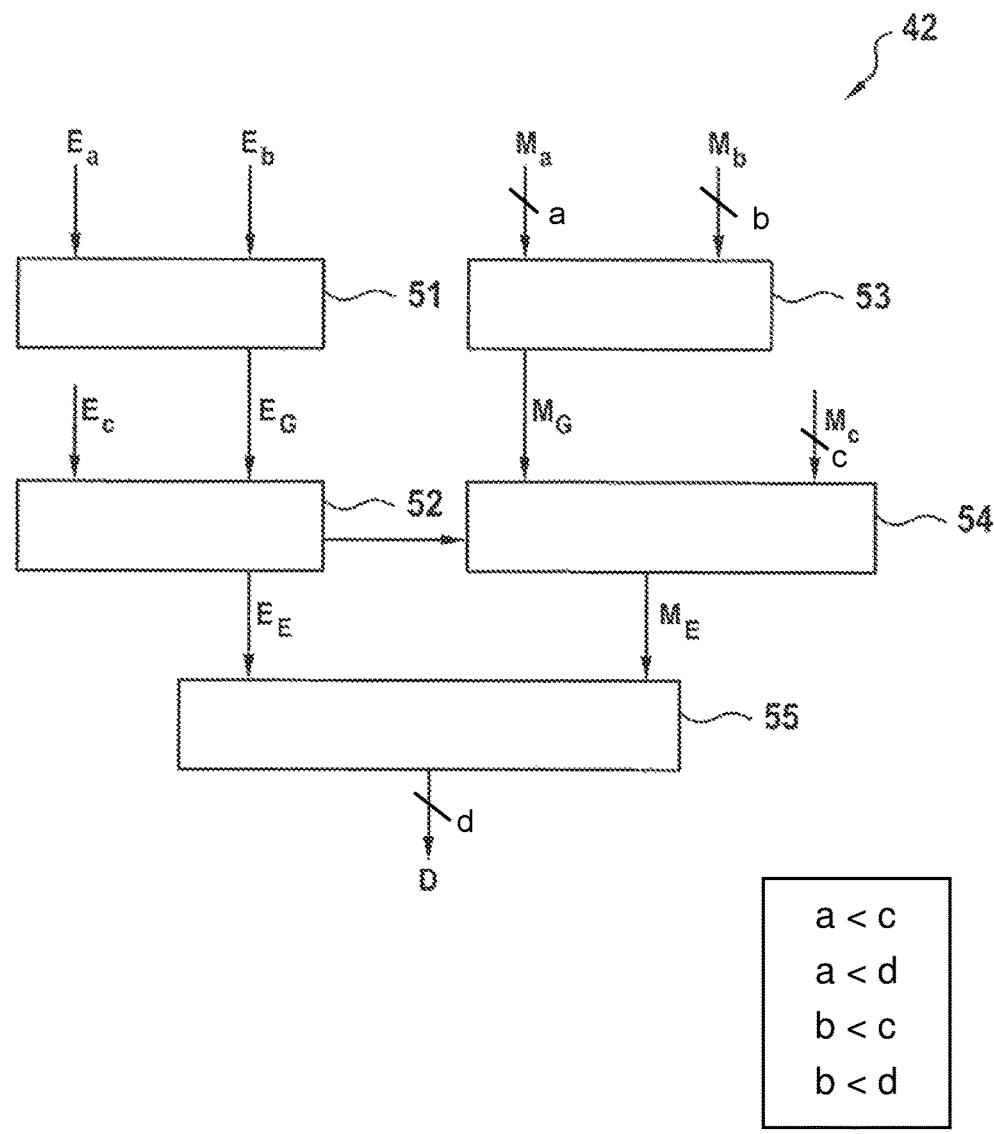

FMA UNIT, IN PARTICULAR FOR UTILIZATION IN A MODEL COMPUTATION UNIT FOR PURELY HARDWARE-BASED COMPUTING OF FUNCTION MODELS

FIELD OF THE INVENTION

The present invention relates to units implemented in hardware in a control unit, in particular floating point multiply and add operation units, e.g., fused multiply-add operation (FMA) units.

BACKGROUND

Control units are known from the related art which have a main arithmetic unit and a separate model computation unit for computing data-based function models. For example, the publication DE 10 2010 028 266 A1 shows a control unit having an additional logic circuit as the model computation unit which is designed for purely hardware-based computation of multiplications, additions, and exponential functions in one or more loop computations. This makes it possible to support Bayesian regression processes, which are needed in particular for the computation of Gaussian process models, in a hardware unit.

The model computation unit is designed overall to carry out mathematical processes for computing the data-based function model based on parameters and node or training data. The model computation unit is, in particular, designed for efficient hardware-based computation of exponential functions in two computational loops, so that it is possible to compute Gaussian process models at a higher computation rate than may take place in the software-operated main arithmetic unit. In order to accelerate the computation in the logic unit, multiplication and addition processes may be combined in a joint multiplier-accumulator (MAC) or FMA unit which makes a hardware implementation available for an addition and a multiplication operation in a particularly efficient manner.

For example, U.S. Pat. No. 7,080,111 describes such an FMA unit for an input-side and an output-side resolution of 32 bits, and U.S. Pat. No. 7,346,642 also shows such an FMA unit which, however, is more accurate.

SUMMARY

According to example embodiments of the present invention, the FMA unit is provided to carry out an arithmetic operation in a model computation unit in a control unit.

According to an example embodiment of the present invention, an FMA unit is provided to carry out an arithmetic operation in a model computation unit in a control unit, two factors and one summand each being processable as input variables in the form of a floating point value and the computation result being provided as an output variable in the form of a floating point value with a mantissa result and an exponential result, the FMA unit being designed to carry out a multiplication and a subsequent addition, the bit resolutions of the inputs for the factors being lower than the bit resolutions of the input for the summand and the bit resolution of the output variable.

The FMA unit mentioned above carries out a multiplication of two factors and an addition of the multiplication result to a summand. The FMA unit mentioned above differs from the known FMA units in that the factors are provided and computed at a lower accuracy than the summand and the result of the computation in the FMA unit. Furthermore, the intermediate result of the multiplication is provided without loss of accuracy. When selecting the individual bit resolutions, the circumstances must be assessed by taking into consideration that if the FMA unit is used in a model computation unit which provides one or more computational loops, sum formations are carried out repeatedly accumulatively and a sufficient accuracy must be achieved in the process. A sufficient bit resolution must, in particular, be provided due to numerical problems in the case of very small accumulated values, i.e., values close to zero, or in the case of very large values of the summands.

If, however, the bit resolutions of the factors and summands are selected to be excessively high, more logic is needed due to the hardware implementation of the algorithm, so that the necessary space for implementing the FMA unit as an integrated configuration is significantly enlarged, and additionally, the performance of the hardware is reduced.

The FMA unit mentioned above proposes the utilization of the multiplication part of the FMA unit with a reduced accuracy. This means that the factors may only be predefined and computed using a bit resolution which is lower than the bit resolution of the subsequent sum formation. This results in a noticeable saving of the required chip space since the multiplication part represents that part of the FMA unit which requires the largest space. In particular, if the bit resolution of the factors or of their mantissa values for the multiplication corresponds to half or less than half of the bit resolution of the output value and of the summand or of their mantissa values, an internal conversion of the multiplication result into a value of reduced bit resolution is no longer necessary in order to be able to carry out the addition as used to be the case previously.

The bit resolution of the intermediate result of the multiplication may rather be selected in such a way that the accuracy is not reduced. For example, the factors may be provided with an accuracy of 32 bits floating point format (single precision) having an exponent of 8 bits and a mantissa of 23 bits. A 24 bits×24 bits integer multiplication may be applied which results in a fractional accuracy of 48 bits. Furthermore, due to the reduced bit resolution of the factors, the data quantity which is to be made available as input variables may be reduced, since, for example, in the case of a desired end result of a 64 bit resolution, the two factors must only be made available in a 32 bit resolution.

Furthermore, the FMA unit may include:

an exponent addition block which is designed to add the exponents of the factors to form a product of the exponents and make available a corresponding exponent intermediate result;

a multiplication block which is designed to multiply the mantissa values of the factors and to obtain a mantissa multiplication result;

an exponent evaluation block which is designed to ascertain a difference between exponent intermediate result $E_G$ and the exponent of the summand and to make available an exponent result; and an addition block which is designed to subject the mantissa multiplication result or the mantissa of the summand to a right shift operation—and to subsequently add them—as a function of the ascertained difference between exponent intermediate result $E_G$ and the exponent of the summand, in order to obtain a mantissa result, the mantissa result and exponent result indicating the output variable; the bit resolutions of the inputs of the exponent addition block and of the multiplication block are lower than the bit resolutions of the inputs of the exponent evaluation block and the addition block.

According to an example embodiment, the factors can be of a first mantissa bit resolution and a first exponent bit resolution, and the summand and the output variable can be of a second mantissa bit resolution and a second exponent bit resolution, the second mantissa bit resolution being at least double the first mantissa bit resolution.

In an example embodiment, the exponent evaluation block is designed to make available the exponent result as a value of the larger exponent from exponent intermediate result $E_G$ and the exponent of the summand, the addition block being designed to subject, as a function of the ascertained difference between exponent intermediate result $E_G$ and the exponent of the summand, to a right shift operation whichever of the mantissa multiplication result and the mantissa of the summand is assigned the smaller exponent.

In an example embodiment, a standardization block standardizes the exponent result and the mantissa result, to transfer it into a corresponding floating point representation, and to make it available.

According to an example embodiment, a model computation unit for a control unit includes a processor core, the processor core including a logic unit for computing an algorithm which is implemented in hardware, an FMA unit being provided for carrying out an addition and/or multiplication operation.

In particular, the logic unit may be designed to compute a Bayesian regression.

According to an example embodiment, a control unit includes a software-controlled main arithmetic unit and the above-described model computation unit.

According to an example embodiment, a memory is arranged to store hyperparameters and node data, the hyperparameters and the node data being made available at the lower bit resolution.

Example embodiments are explained in greater detail below on the basis of the attached drawings.

BRIEF DESCRIPTION OF THE DRAWINGS

FIG. 3 shows a schematic representation of an FMA computation in the model computation unit of FIG. 1, according to an example embodiment of the present invention.

DETAILED DESCRIPTION

The floating point formats used in the following description are based on the IEEE-754 standard.

Figure 1:
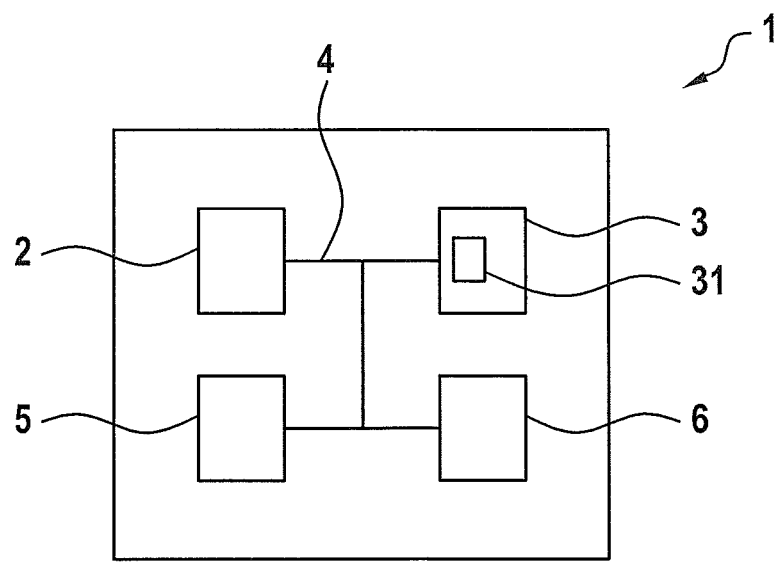
FIG. 1 shows a schematic representation of a control unit that includes a model computation unit, according to an example embodiment of the present invention.

FIG. 1 shows a schematic representation of a hardware architecture for an integrated control unit 1 in which a main arithmetic unit 2 and a model computation unit 3 are provided in an integrated manner for the purpose of hardware-based computation of a data-based function model. Main arithmetic unit 2 and model computation unit 3 are communicatively linked to one another via an internal communication link 4 such as a system bus. Furthermore, in an example embodiment, control unit 1 includes an internal memory 5 and a direct memory access (DMA) unit 6 which are linked to one another via internal communication link 4.

Model computation unit 3 is basically hardwired and accordingly not designed to execute a software code. For this reason, a processor is not provided in model computation unit 3. This allows for a resource-optimized implementation of such a model computation unit 3 or a space-optimized configuration as an integrated architecture. Model computation unit 3 includes a processor core 31 which implements a computation of a predefined algorithm purely in hardware. For this purpose, processor core 31 includes a logic circuit 43, an exponential function unit 41 for hardware-based computation of an exponential function, and an FMA unit 42 for hardware-based computation of a combined multiplication and addition operation.

The utilization of nonparametric, data-based function models is based on a Bayesian regression process. The principles of Bayesian regression are described, for example, in C. E. Rasmussen et al., "Gaussian Processes for Machine Learning," MIT Press 2006. The Bayesian regression is a data-based process which is based on a model. To create the model, measuring points of training data as well as the associated output data of an output variable are needed. The model is created based on the utilization of node data which correspond entirely or partially to the training data or are generated therefrom. Furthermore, abstract hyperparameters are determined which parameterize the space of the model functions and effectively weigh the influence of the individual measuring points of the training data with regard to the later model prediction.

To start a computation, arithmetic unit 2 instructs DMA unit 6 to transfer the configuration data, which are relevant for the function model to be computed, to model computation unit 3 and to start the computation which is carried out with the aid of the configuration data. The configuration data include the hyperparameters of a Gaussian process model as well as node data which are preferably indicated with the aid of an address pointer on the address area of memory 5 which is assigned to model computation unit 3.

The computation takes place in model computation unit 3 in a hardware architecture implementing the pseudocode presented below, which corresponds to the computation specification mentioned above. It is recognizable from the pseudocode that computations may take place in an inner loop and an outer loop and that their partial results are accumulated.

```
/* stage 1: input standardization */
001: for (k=0; k<D; k++) {
002:   u[k] = u[k]*(s'_x)[k]+(m'_x)[k]; FMA
003: }
/* stage 2: computation outer loop */
004: for (j=0; j<N; j++) {
005:   i = j * D;
/* stage 2a: computation inner loop */
006:   t = 0.0;
007:   for (k=0; k<D; k++) {
008:     d = u[k] - v[i+k]; FMA addition
009:     d = d*d; FMA multiplication
010:     t + = 1' [k]*d; FMA
011:   }
/* stage 2b: computation exponential function */
012:   e = exp(-t);
/* stage 2c: */
013:   y + = (Q'_y)[j] * e; FMA
014: }
/* stage 3: output standardization */
015: z = m_y;
016: z + = y*s_y; FMA
017: return z;
```

In the case of a hardware implementation, a computation of the format a×b+c is possible with the aid of an FMA unit in a particularly efficient manner. Such an FMA unit can be implemented in hardware to be able to carry out a corresponding computation within a few clock cycles. Under certain circumstances, the computation can even take place within one clock cycle. The computation is implemented in hardware as indicated in the appended pseudo-c-code.

Figure 2:
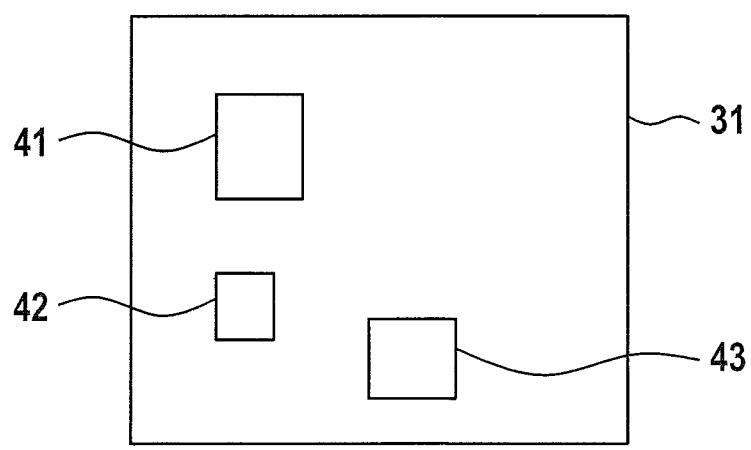
FIG. 2 shows a schematic representation of a processor core of a model computation unit, according to an example embodiment of the present invention.

The computation of the algorithm mentioned above can be carried out with the aid of the following units in processor core 31 which is represented in FIG. 2 in greater detail. Processor core 31 includes for this purpose the logic circuit 43, the exponential function unit 41, and the FMA unit 42 which makes available a combined multiplication and addition operation of input variables in a floating point format.

The above-mentioned computation sequence which is indicated in the pseudo-c-code is controlled by a suitable logic circuit 43 which implements the algorithm as hardware. Logic circuit 43 represents a corresponding wiring and sequence control.

FIG. 3 shows a schematic representation of a computation in FMA unit 42. Input variables a, b, c, namely factors a, b and summand c, are made available to FMA unit 42 for the computation of a×b+c. Input variables a, b, c are made available in a floating point format. In particular, the inputs for factors a, b are made available in a first bit resolution and the input for summand c and the output are made available in a second bit resolution. The first bit resolution is lower than the second bit resolution. In one example, the first bit resolution is 32 bits and the second bit resolution is 64 bits.

FMA unit 42 contains an exponent addition block 51 for adding exponents $E_a$, $E_b$ of input variables (factors) a, b for the product formation of the exponents and for making available a corresponding exponent intermediate result $E_G$ to an exponent evaluation block 52. Furthermore, mantissa values $M_a$, $M_b$ of factors a, b are multiplied in a multiplication block 53 and corresponding mantissa multiplication result $M_G$ is made available to an addition block 54.

Furthermore, exponent $E_c$ of summand c is supplied to exponent evaluation block 52. Exponent intermediate result $E_G$ of exponent addition block 51 is adjusted to exponent $E_c$ of summand c. For this purpose, a difference is formed from exponent $E_c$ of the summand and exponent intermediate result $E_G$ and communicated to addition block 54. The larger of exponent values $E_c$, $E_G$ is forwarded to a downstream standardization block 55 as exponent result $E_E$.

Furthermore, mantissa $M_c$ of summand c is supplied to addition block 54. A corresponding right shift of one of mantissas $M_c$, $M_G$ supplied to the addition block is carried out by a number of bits which corresponds to the ascertained difference. In particular, the absolute value of that one of the mantissas, namely mantissa $M_c$ of summand c or mantissa multiplication result $M_G$, whose associated exponent is lower, is increased by a right shift operation. Subsequently, i.e., following the right shift operation, an addition or a subtraction (depending on the algebraic sign) of now present mantissa values $M_c$, $M_G$ is carried out in order to obtain a mantissa result $M_E$. Mantissa result $M_E$ is forwarded to the downstream standardization block 55.

The result which is formed from mantissa result $M_E$ and exponent result $E_E$ is then standardized by standardization block 55 in order to thus form the end result. The mantissa value of the end result is preferably standardized to a value between [1.0; 2.0], for example. It is apparent that standardization is only necessary at the end of the computation process and not immediately after the multiplication. In this way, it is advantageously possible to use for the model computation a multiplication with a lower bit resolution than the bit resolution of the subsequent addition.

In an example embodiment, the conducted multiplication uses 24 bit×24 bit mantissa values (23 bit mantissa+hidden bit) yielding a 48 bit result in order to obtain mantissa multiplication result $M_G$. The multiplication may, for example, be carried out with the aid of a multiplier array, a carry-save adder, or a higher radix multiplier. Since summand c has a higher bit resolution than factors a or b, it is not necessary to standardize mantissa multiplication result $M_G$ to a 32 bit value, i.e., a value having a 24 bit mantissa value and an 8 bit exponent value. The bit resolution of the mantissa value is 53 bits for the 64 bit resolution of summand c. For this reason, the 48 bit result of the mantissa value can be used and expanded to 53 bits prior to the addition. The simplest extension is adding zeros to the lowest 5 bits.

Furthermore, it is also possible to carry out a preliminary adaptation by adjusting exponent intermediate result $E_G$ and exponent $E_c$ of summand c, so that the expansion mentioned above can include a right shift operation of the mantissa value which is assigned a lower exponent value. In this way, different advantages can be achieved, such as improved accuracy for the adder, since the multiplication result is not rounded to 24 bits.

Furthermore, the space requirement can be kept low in the case of an integrated configuration of FMA unit 42, since only a 24 bit×24 bit multiplier is needed. As a result of the low bit resolution of the input variables for the multiplication as compared to the bit resolution of the end result, a great performance of the hardware computation may be achieved.

What is claimed is:

1. A model computation unit including:
a floating point multiply and add operation unit for carrying out an arithmetic operation, comprising:
processing circuitry configured to obtain two factors and a summand as input variables, that each is in a floating point value format, process the input variables, and output, based on the processing, a computation result in a floating point value format;
wherein:
the processing includes multiplying the factors and adding (a) a product of the multiplication and (b) the summand; and
a bit resolution of the multiplied factors is lower than a bit resolution of the summand and is lower than a bit resolution of the computation result; and
a memory configured to store hyperparameters and node data of a data-based function model, the hyperparameters and the node data being made available at the lower bit resolution;
wherein the processing circuitry at least partly computes the data-based function model by performing arithmetic operations with the hyperparameters and the node data.

2. The model computation unit of claim 1, wherein the factors are formed of respective mantissas of a first mantissa bit resolution and respective exponents of a first exponent bit resolution, and the summand and the computation result are formed of respective mantissas of a second mantissa bit resolution and respective exponents of a second exponent bit resolution, the second mantissa bit resolution being at least double the first mantissa bit resolution.

3. The model computation unit of claim 2, wherein the processing circuitry includes:

an exponent addition block configured to add the exponents of the factors to produce an exponent product;

a multiplication block configured to multiply the mantissas of the factors and to produce a mantissa product;

an exponent evaluation block configured to ascertain a difference between the exponent product and the exponent of the summand and to output an exponent result based on the ascertained difference; and an addition block configured to subject, as a function of the ascertained difference, the mantissa product or the mantissa of the summand to a right shift operation, and to subsequently add the mantissa product and the mantissa of the summand to produce a mantissa result, the mantissa result and the exponent result being output as a combined output variable;

wherein the bit resolutions of the mantissas multiplied by the multiplication block are lower than the bit resolution of the inputs provided to the addition block.

4. The model computation unit of claim 3, wherein:

the exponent evaluation block is configured to select whichever of the exponent product and the exponent of the summand is greater as the exponent result;

the addition block is configured to subject to a right shift operation whichever of the mantissa product and the mantissa of the summand is assigned the smaller of the exponents compared by the exponent evaluation block.

5. The model computation unit of claim 1, wherein the processing circuitry further includes a standardization block to standardize the exponent result and the mantissa result.

6. The model computation unit of claim 1, wherein the processing is a hardwired processing by the processing circuitry.

7. The model computation unit of claim 1, wherein the operation unit is a fused multiply-add (FMA) operation unit.

8. The operation unit of claim 1, wherein the data-based function model includes a Gaussian process model.

9. A model computation unit for a control unit, the model computation unit comprising a processor core, the processor core including:

a logic unit configured to compute a data-based function model, the computation being implemented in hardware; and a floating point multiply and add operation unit that includes processing circuitry configured to obtain two factors and a summand as input variables, that each is in a floating point value format, process the input variables, and output, based on the processing, a computation result in a floating point value format;

wherein:

the processing includes multiplying the factors and adding (a) a product of the multiplication and (b) the summand; and a bit resolution of the multiplied factors is lower than a bit resolution of the summand and is lower than a bit resolution of the computation result; and a memory configured to store hyperparameters and node data of the data-based function model, the hyperparameters and the node data being made available at the lower bit resolution;

wherein the processing circuitry at least partly computes the data-based function model by performing arithmetic operations with the hyperparameters and the node data.

10. The model computation unit of claim 9, wherein the processor core is configured to compute a Bayesian regression.

11. The model computation unit of claim 9, wherein the data-based function model includes a Gaussian process model.

12. A control unit, comprising:

a software-controlled main arithmetic unit; and a model computation unit, the model computation unit comprising a processor core that includes:

a logic unit configured to compute a data-based function model, the computation being implemented in hardware; and a floating point multiply and add operation unit that includes processing circuitry configured to obtain two factors and a summand as input variables, that each is in a floating point value format, process the input variables, and output, based on the processing, a computation result in a floating point value format;

wherein:

the processing includes multiplying the factors and adding (a) a product of the multiplication and (b) the summand; and a bit resolution of the multiplied factors is lower than a bit resolution of the summand and is lower than a bit resolution of the computation result; and a memory configured to store hyperparameters and node data of the data-based function model, the hyperparameters and the node data being made available at the lower bit resolution;

wherein the processing circuitry at least partly computes the data-based function model by performing arithmetic operations with the hyperparameters and the node data.

13. The control unit of claim 12, wherein the data-based function model includes a Gaussian process model.

* * * * *